United States Patent
Hsieh et al.

(10) Patent No.: US 9,613,405 B2
(45) Date of Patent: *Apr. 4, 2017

(54) SCALABLE MASSIVE PARALLELIZATION OF OVERLAPPING PATCH AGGREGATION

(71) Applicant: Adobe Systems Incorporated, San Jose, CA (US)

(72) Inventors: Chih-Yao Hsieh, San Jose, CA (US); Zhe Lin, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,924

(22) Filed: Jun. 21, 2016

(65) Prior Publication Data

US 2016/0300331 A1 Oct. 13, 2016

Related U.S. Application Data

(63) Continuation of application No. 14/339,874, filed on Jul. 24, 2014, now Pat. No. 9,396,522.

(51) Int. Cl.
*G06K 9/40* (2006.01)
*G06T 5/00* (2006.01)
(Continued)

(52) U.S. Cl.
CPC ............ *G06T 5/003* (2013.01); *G06T 3/4053* (2013.01); *G06T 3/4076* (2013.01); *G06T 5/00* (2013.01);
(Continued)

(58) Field of Classification Search
CPC ........... G06T 11/00; G06T 2207/20021; G06T 3/4053; G06T 3/4076; G06T 5/00; G06T 5/001
(Continued)

(56) References Cited

U.S. PATENT DOCUMENTS 7,978,906 B2 * 7/2011 Jojic ...................... G06K 9/469
382/159
8,065,672 B2 * 11/2011 Sriram ..................... G06F 8/68
717/169

(Continued)

OTHER PUBLICATIONS

Notice of Allowance from related U.S. Appl. No. 14/339,874, dated Mar. 22, 2016, 7 pages.

*Primary Examiner* — Kanjibhai Patel
(74) *Attorney, Agent, or Firm* — Kilpatrick Townsend & Stockton LLP

(57) ABSTRACT

Techniques for enhancing an image using pixel-specific processing are disclosed. An image can be enhanced by updating certain pixels through patch aggregation. Neighboring pixels of a selected pixel are identified. Respective patch values for patches containing the selected pixel are determined. Patch values provide update information for updating the respective pixels in the patch. Relevant patch values for the selected pixel are identified by identifying associated patches of the pixel. Information from the relevant patch values of the selected pixel may be obtained. Using this information, pixel-specific processing may be performed to determine an updated pixel value for the selected pixel or for neighboring pixels of the selected pixel. Pixel-specific processes may be executed for each of the selected or neighboring pixels. These pixel-specific processes can be executed in parallel. Therefore, through the execution of pixel-specific processes, which may be performed concurrently, an enhanced image may be determined.

20 Claims, 6 Drawing Sheets

(51) Int. Cl.
*G06T 3/40* (2006.01)
*G06T 11/00* (2006.01)
*G06T 5/20* (2006.01)
*G06T 11/60* (2006.01)

(52) U.S. Cl.
CPC .............. *G06T 5/001* (2013.01); *G06T 5/002* (2013.01); *G06T 5/20* (2013.01); *G06T 11/00* (2013.01); *G06T 11/001* (2013.01); *G06T 11/60* (2013.01); *G06T 2207/20021* (2013.01); *G06T 2207/20024* (2013.01)

(58) Field of Classification Search
USPC ........................................................ 382/254
See application file for complete search history.

(56) References Cited

U.S. PATENT DOCUMENTS

| | | | |
|---|---|---|---|
| 8,233,739 B1 * | 7/2012 | Cho ..................... | G06T 11/60 345/582 |
| 8,571,349 B1 | 10/2013 | Kwatra | |
| 8,675,999 B1 | 3/2014 | Liang | |
| 8,942,467 B2 * | 1/2015 | Porikli ................... | H04N 19/86 382/159 |

* cited by examiner

SCALABLE MASSIVE PARALLELIZATION OF OVERLAPPING PATCH AGGREGATION

CROSS-REFERENCE TO RELATED APPLICATION

This application is a continuation of U.S. patent application Ser. No. 14/339,874 (now allowed), filed on Jul. 24, 2014, the contents of which are incorporated herein by reference in their entirety.

TECHNICAL FIELD

This disclosure relates generally to computer-implemented methods and systems and more particularly relates to image enhancement using patch aggregation.

BACKGROUND

Image editing computer applications perform various image enhancement operations on static or video images. Such image enhancement operations generally involve adjusting images so that the results are more suitable for display or further image analysis. Image enhancement can involve removing noise, sharpening an image or portions of an image, or brightening an image or portions of an image. Image enhancement may take an input image and adjust the individual pixel values (color characteristics) using one or more transformation functions to produce an output image with desired improvements. Image enhancement may add or remove noise from an image, remove unwanted elements, selectively change colors, change image orientation, distort or transform the shape of an image, correct images for lens distortions, make the image lighter or darker, change contrast, apply filters, merge images, change color depth, change contrast and brightness, etc. For example, an image editor can be used to increase the resolution of an images, decrease a level of noise present in the image, and/or decrease an amount of blurring of the image.

Existing image editing computer applications generally enhance images by determining patch updates for multiple patches of the image and then aggregating those patch updates to determine how to update the pixel values of the images. Existing patch aggregation techniques compute pixel update values on a patch-by-patch basis. Such patch-based aggregation techniques cannot be executed in parallel because doing so could result in conflicts when patches attempt to access the same pixel data at the same time. For example, if a given pixel is associated with two patches, executing patch aggregation processes for each of the patches at the same time impermissibly update that pixel at the same time.

SUMMARY

One embodiment involves an image editing computer application that can perform image enhancement using patch aggregation by performing pixel-specific processes that can be executed in parallel. The embodiment involves receiving an input image comprising pixels located in the image and having pixel values indicative of how each of the pixels is displayed in the image. Using an image enhancement algorithm, respective patch values for each of a plurality of patches of the image are determined and may be stored. Each patch value provides update information for updating a respective subset of the pixels, i.e., those in the respective patch, of the image. Patch values that are relevant for updating a given pixel are identified and used to determine an updated pixel value for the pixel. A pixel-specific thread processes may thus be performed to determine an updated pixel value for the pixel based on the relevant patch values. A plurality of pixel-specific thread processes may be executed in parallel to determine updated pixel values for multiple pixels based on respective patch values relevant to each of the respective pixels.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Introduction

Computer-implemented systems and methods are disclosed for image enhancement using pixel-specific processing. Patch updates are determined for multiple patches of an input image. The patch updates are aggregated on a pixel specific basis rather than for an entire patch. Thus, update values are calculated for pixels individually rather than as part of a process calculating pixel update values for all pixels of a given patch. Calculating update values for pixels individually eliminates the possibility of a conflict resulting from two patch-based pixel update processes attempting to update a given pixel at the same time, and thus allows for pixel updates to be performed in parallel.

Figure 1:
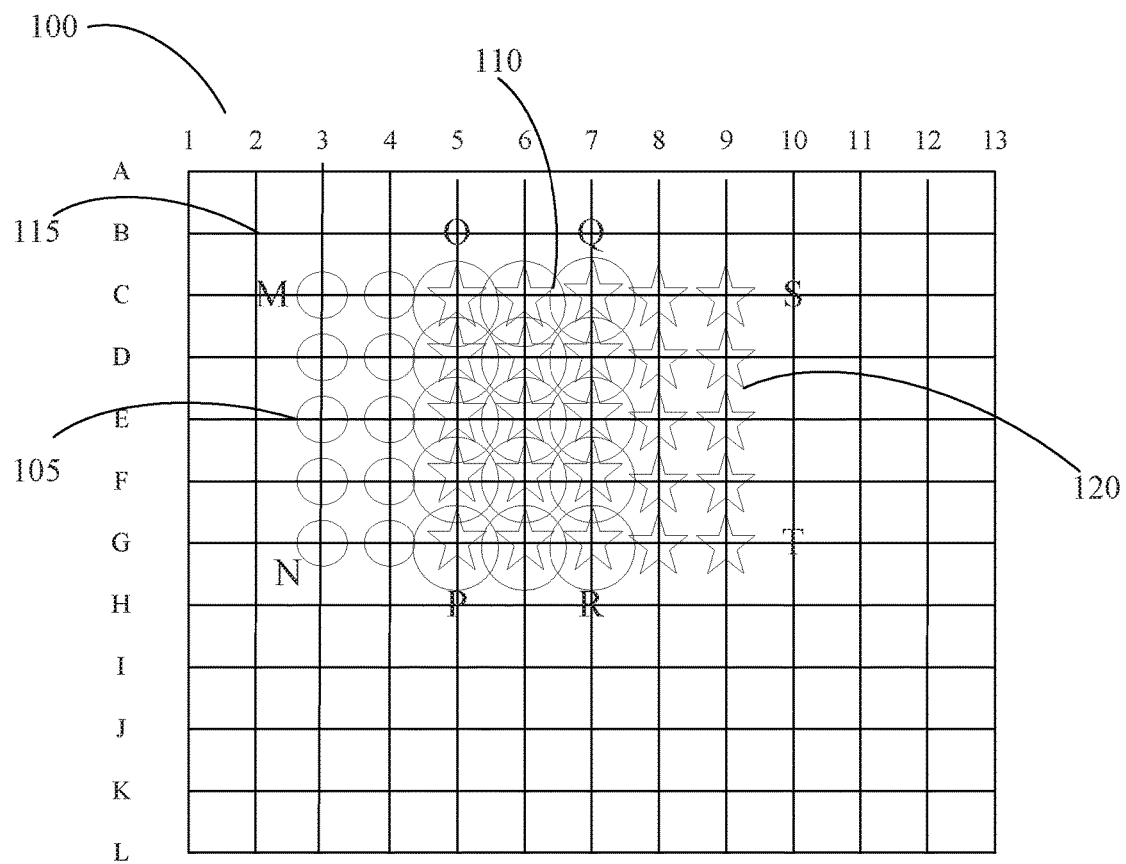
FIG. 1 is an image diagram depicting patch aggregation on overlapping patches.

As used herein, the term "patch" refers to a portion of an image comprised of multiple pixels that is less than all of the image. As examples, an input image can be divided into patches, e.g., 2 pixels×2 pixels, 2 pixels×3 pixels, 3 pixels×3 pixels, 4 pixels×4 pixels, 5 pixels×5 pixels, etc. For some, but not all, image enhancement operations, an image is partitioned into multiple patches of equal size that overlap one another. In FIG. 1, image 100 comprises 156 pixels, each pixel located at each intersection of the grid. For example, one pixel 115 is shown at location B2 on the grid. In this example patches are defined of size 5 pixels×5 pixels. One patch is the 5 pixels×5 pixels patch 105 which includes the 25 pixels shown by circles in square MNQR. The other patch is the 5 pixels×5 pixels patch 120 which includes the 25 pixels shown by stars in square OPST. Patch 105 and patch 120 have an area of 15 pixels that overlap. The pixels that overlap are shown in rectangle 110 with pixels shown by a star within a circle (rectangle OQPR).

Current patch based image enhancement applications determine patch update values for patch 105 and patch 120 but cannot then concurrently update the pixels of these patches 105, 120 because of the potential for conflict, e.g., both attempting to update pixel C5 at the same time. In contrast, this disclosure can use patch updates that are aggregated on a pixel-specific basis rather than for an entire patch and thus allows for the parallel processing and other benefits.

As used herein, the term "image enhancement operation" is used to refer to a process that generates an output image having an improvement in quality for one or more attributes of an input image. Non-limiting examples of an image enhancement operation include a super-resolution operation for generating a high-resolution output image from a low-resolution input image, a de-noising operation for generating de-noised output image from a noisy input image, and a de-blurring operation for generating a sharp output image from a blurry input image.

As used herein, the term "patch update" refers to a change for a sub-region of pixels of the image, for example, by adding values (positive or negative) to the intensity value of the pixels that make up the patch.

As used herein, the term "pixel update" refers to a change or update to the pixel value associated with the pixel, for example, by adding relevant patch update values (positive or negative) to the intensity of the pixel.

As used herein, the term "patch value" is a value assigned to a respective patch that provides update information for updating the respective subset of pixels that make up the patch.

Pixel-Specific Patch Aggregation Technique

In one embodiment, an image enhancement algorithm determines respective patch values for each of a plurality of patches of the image. Each patch value provides update information for updating the respective pixels in a patch. For each of the selected pixels in an image, relevant patch values are identified. The relevant patch values are patch values for patches associated with a pixel.

Figure 2A:
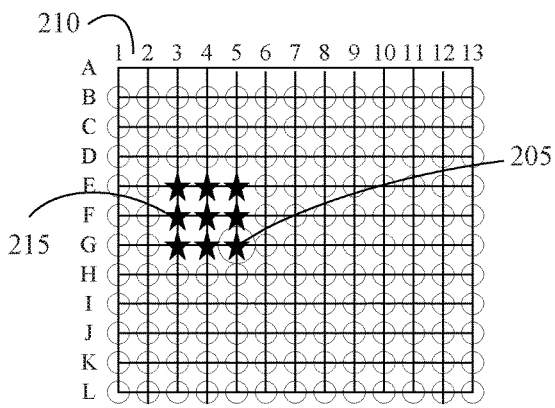
FIGS. 2A-2I are image diagrams illustrating patch aggregation by performing a pixel-specific operations.
Figure 2B:
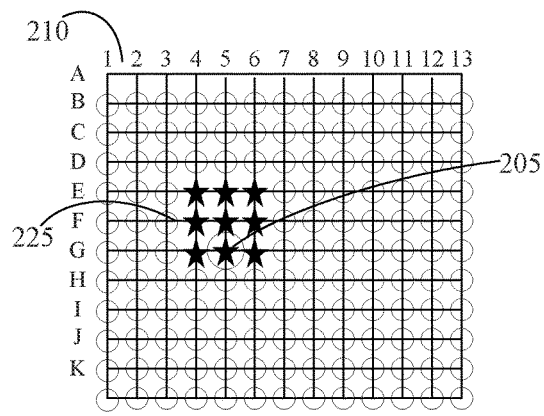
Figure 2C:
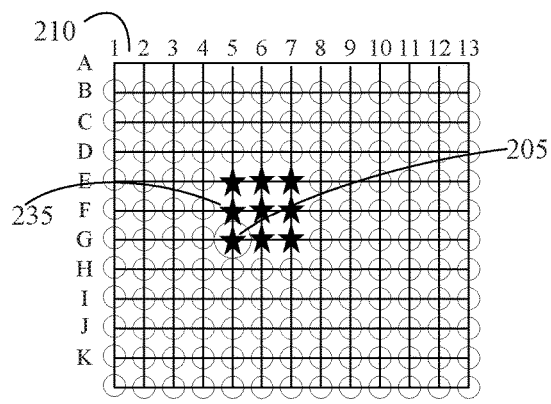
Figure 2D:
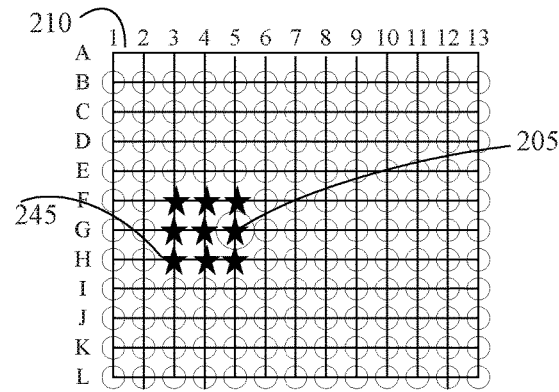
Figure 2E:
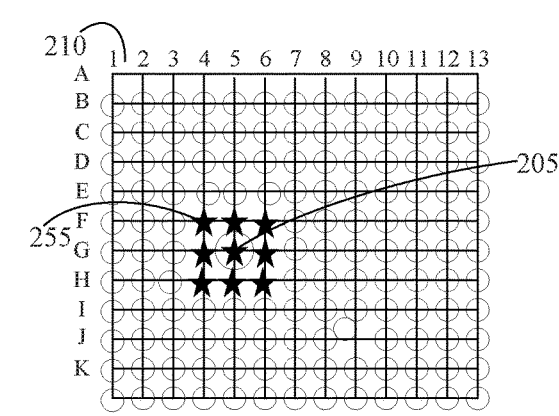
Figure 2F:
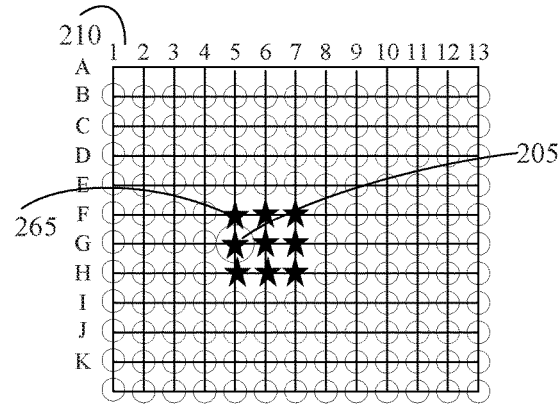
Figure 2G:
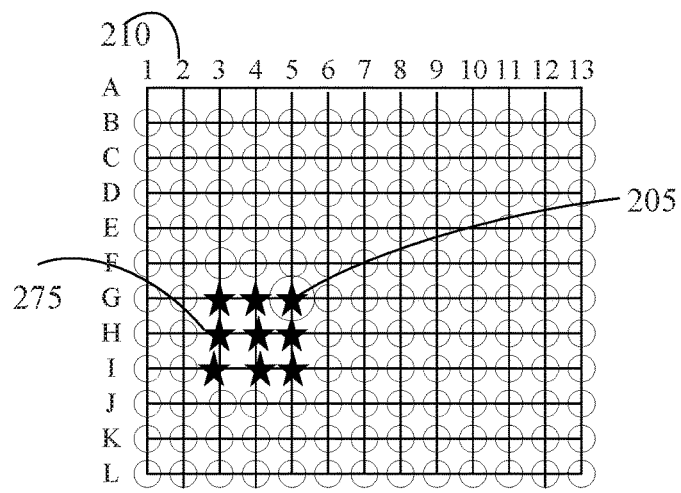
Figure 2H:
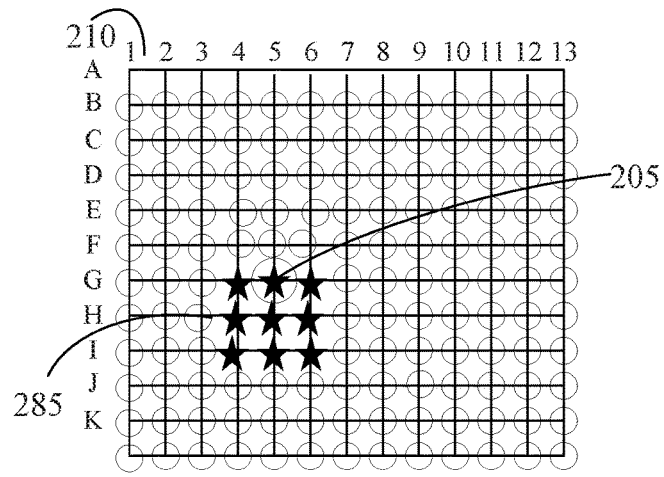
Figure 2I:
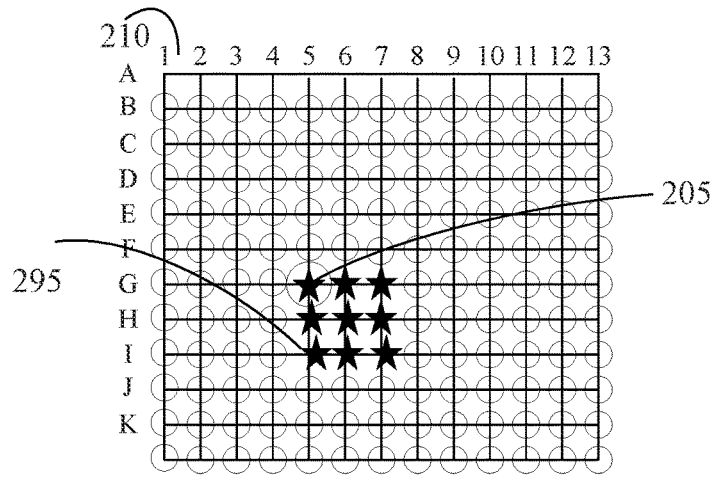

FIGS. 2A through 2I are diagrams illustrating updating a pixel value of a pixel in an input image to determine an updated pixel value for the pixel in an enhanced image. In this example, the relevant patch values will be determined from patches of size 3 pixels by 3 pixels. FIGS. 2A-2I show input image 210 made up of multiple pixels. In this example, the pixel value for pixel 205 at location G5, which is set to 9, will be updated. There are nine patches of size 3 pixels by 3 pixels that contain pixel 205. These nine patches that overlap or contain pixel 205 as one of its pixels are referred to as patches associated with pixel 205 or "associated patches." The nine associated patches are illustrated consecutively in FIGS. 2A-2I as patches 215, 225, 235, 245, 255, 265, 275, 285, and 295. Patch 215 is shown in FIG. 2A having 9 pixels (shown by stars), one of which is pixel 205 located in the bottom-right of patch 215. Patch 225 is shown in FIG. 2B having 9 pixels (shown by stars), one of which is pixel 205 located in the bottom-center of patch 225. Patch 235 is shown in FIG. 2C having 9 pixels (shown by stars), one of which is pixel 205 located in the bottom-left of patch 235. Patch 245 is shown in FIG. 2D having 9 pixels (shown by stars), one of which is pixel 205 located in the center-right of patch 245. Patch 255 is shown in FIG. 2E having 9 pixels (shown by stars), one of which is pixel 205 located in the center of patch 255. Patch 265 is shown in FIG. 2F having 9 pixels (shown by stars), one of which is pixel 205 located in the center-left of patch 265. Patch 275 is shown in FIG. 2G having 9 pixels (shown by stars), one of which is pixel 205 located in the top-right corner of patch 275. Patch 285 is shown in FIG. 2H having 9 pixels (shown by stars), one of which is pixel 205 located in the top-center of patch 285. Patch 295 is shown in FIG. 2I having 9 pixels (shown by stars), one of which is pixel 205 located in the top-left of patch 295.

In accordance with some embodiments, the associated patches for a selected pixel may be determined through the use of a look-up table. For the previous example, the selected pixel 205 may be used as a key in a look-up table to determine its nine associated patches 215, 225, 235, 245, 255, 265, 275, 285, and 295.

Each of the patches in an image has a corresponding patch value. An image enhancement algorithm determines a patch value for each of the patches in an image. An image enhancement algorithm may gather information of an image both in geometry (shifts and rotation) and in image conditions (lighting or noise) to determine a patch value. Some examples of image enhancement methods include filtering with morphological operators, histogram equalization, noise removal using a Wiener filter, linear contrast adjustment, median filtering, unsharp mask filtering, contrast-limited adaptive histogram equalization, and decorrelation stretch among others. For example, if the image enhancement algorithm implements patch-based sharpen methods, the patch value determined for a respective patch may correspond to a shift offset represented by positive or negative values.

Each patch value provided by an image enhancement algorithm provides update information for updating the pixels that make up the respective patch. In accordance with some embodiments, the patch values for patches in an image may be kept in a look-up table. In the example from FIGS. 2A-2I, a look-up table may contain the patch values corresponding to each of the nine associated patches. For this example, as shown in Table 1, using the patches shown in FIGS. 2A-2I, patches 215, 225, and 235 each have a patch value of 9. Patches 245, 255, and 265 each have a patch value of 8. Patches 275, 285, and 295 each have a patch value of 7.

The patch values for the associated patches of an image are the relevant patch values. To update the pixel value of the selected pixel 205, a pixel-specific thread process may determine the aggregate patch value based on the relevant patch values. The aggregate patch value may be determined by normalization of the relevant patch values. Alternatively, the maximum or minimum of the relevant patch values may be used as the aggregate patch value. The determination to use normalization, maximum, or minimum of the relevant patch values may be dependent on the image enhancement algorithm used.

In the current example, the aggregate patch value to be used to update the pixel value of pixel 205 is the average of the relevant patch values listed in Table 1, which is 8. The aggregate patch value of 8 can therefore be used by the pixel-specific thread process to update the pixel value of pixel 205 from 9 (its original value) to 8 (the aggregate patch value). Note that this example shows the aggregate patch value replacing the original selected pixel value. However, the aggregate patch value may be used differently to update the pixel value. A transformation function may use the aggregate patch value and the original pixel value to determine an updated pixel value.

The number of pixels to be updated in an image may be designated. In other words, not every pixel in an image must be updated. For example, every other pixel in an image may be updated or any pattern of pixels in an image may be updated. In this embodiment, pixels in an image may be designated to be updated. An aggregate patch value is determined for each of the pixels designated to be updated.

The aggregate patch value would then be used to update the designated pixel. Pixels not designated to be updated would not be updated and these pixels would retain their original pixel value.

Figure 3:
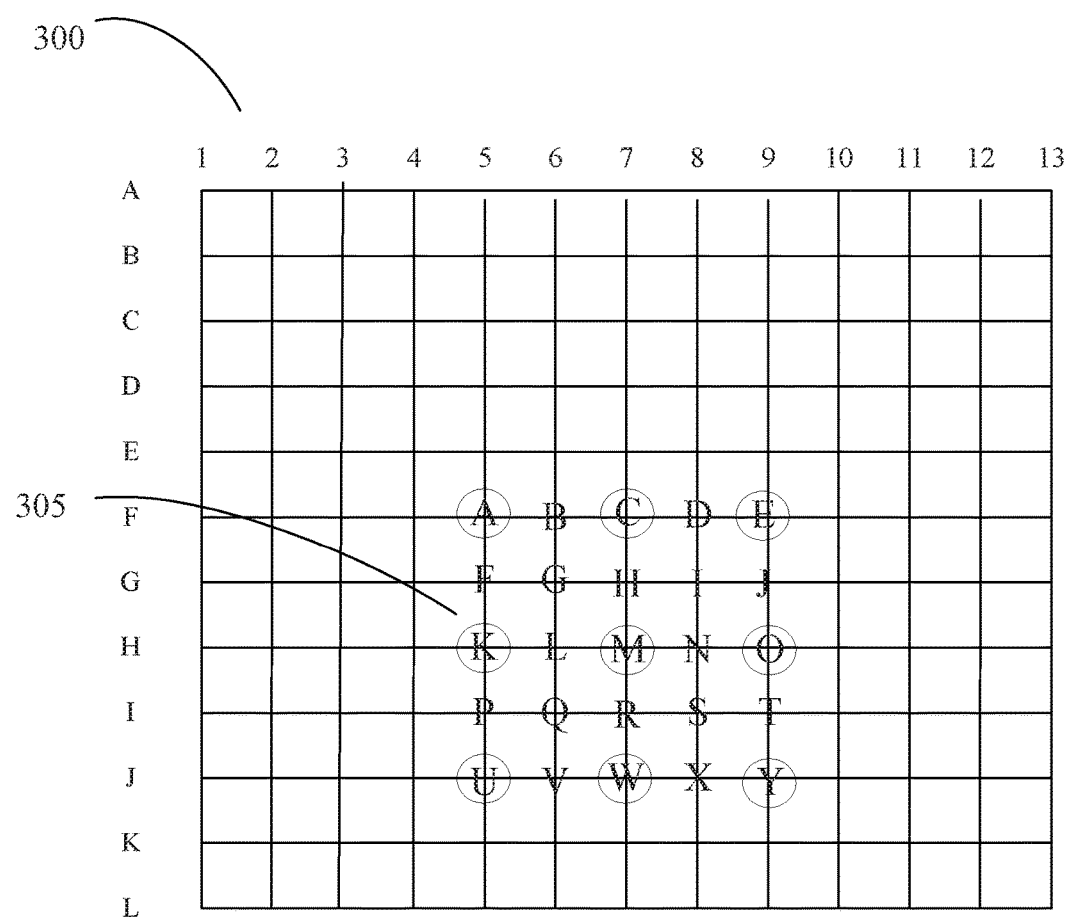
FIG. 3 is an image diagram illustrating designated pixels in an image for performing pixel-specific operations.

As shown in FIG. 3, image 300 is shown. Patch size may be designated as 5 pixels by 5 pixels as shown by patch 305. Pixels A-Y make up patch 305. Designated pixels to be updated include pixels surrounded by a circle, pixels A, C, E, K, M, O, U, W, and Y. Aggregate patch values would be determined for each of these pixels. The aggregate patch value determined for pixel A would be used to update pixel A. The aggregate patch value determined for pixel C would be used to update pixel C and so on for each of the designated pixels. Pixels that are not designated would remain the same. Therefore, pixels B, D, F, G, H, I, J, P, W, R, S, T, V, and X would not be changed and retain their original pixel value.

In another embodiment, pixels that are not designated may still be updated using the aggregate patch value of neighboring pixels. For example, in FIG. 3, pixel B may be updated using the aggregate patch value of neighboring pixel A or neighboring pixel C. This embodiment allows all pixels to be updated in an image without having to determine an aggregate patch value for every pixel.

As can be appreciated from the examples above, updating a selected pixel is independent from updating any other pixels in the image. Given this independence, any number of pixels in an image may be updated concurrently. For example, image 210 of FIG. 2A-2I, any number of pixels may be updated in parallel. A pixel-specific process for each pixel to be updated would determine the relevant patch values for the associated patches of the selected pixel. The pixel-specific process would then determine an aggregate patch value and update the selected pixel value based on the aggregate patch value. Since updating a pixel is independent of other pixels or patches, a plurality of pixel-specific thread processes may be executed in parallel to determine updated pixel values for multiple pixels based on respective patch values relevant to each respective pixel.

In accordance with some embodiments, the image enhancement application can determine weights to assign to associated patches based on the location of the selected pixel within the patch. The weight for a given patch can determine the relative contribution of the patch value. For example, an associated patch which contains the selected pixel in the center may apply a heavier weight than an associated patch which contains the selected pixel as a corner pixel.

TABLE 1

| | Patch | | | | | | | | |
|---|---|---|---|---|---|---|---|---|---|
| | 215 | 225 | 235 | 245 | 255 | 265 | 275 | 285 | 295 |
| Patch Value | 9 | 9 | 9 | 8 | 8 | 8 | 7 | 7 | 7 |
| Weight A | 1 | 2 | 1 | 2 | 3 | 2 | 1 | 2 | 1 |
| Weight B | 10 | 10 | 1 | 2 | 3 | 2 | 8 | 2 | 8 |

Referring to Table 1 using weights designated under Weight A and FIGS. 2A-2I, the associated patch 255 which contains pixel 205 in the center is assigned a weight of 3. The associated patches 225, 245, 265, and 285 which contain pixel 205 on its perimeter are assigned weights of 2. The associated patches 215, 235, 275, and 295 which contain pixel 205 as a corner pixel are assigned a weight of 1. Therefore, in accordance with some embodiments, the weight of each associated patch as well as the relevant patch values are used to determine the aggregate patch value for a selected pixel. In this example, the weight given to each patch determines the number of times the patch value is included when calculating the aggregate patch value. For example, the patch value of 9 for patches 215 and 235 will be included once each in the calculation of the aggregate patch value as their respective weight is 1. The patch value of 9 for patch 225 will be included twice in the calculation of the aggregate patch value as its weight is 2. The patch value of 8 for patches 245 and 265 will be included twice each in the calculation of the aggregate patch value as their respective weight is 2. The patch value of 9 for patch 255 will be included three times in the calculation of the aggregate patch value as its weight is 3. The patch value of 7 for patches 275 and 295 will be included once each in the calculation of the aggregate patch value as their respective weight is 1. The patch value of 7 for patch 285 will be included twice in the calculation of the aggregate patch value as its weight is 2. Therefore, the aggregate patch value may be calculated as the normalized value of each weight times its respective patch values. The aggregate patch value for the example above would be the normalized value of the summation of weight times patch values: $1(9)+2(9)+1(9)+2(8)+3(8)+2(8)+1(7)+2(7)+1(7)=120$. Once normalized the aggregate patch value is 8. The aggregate patch value of 8 can therefore be used by the pixel-specific thread process to update the pixel value of pixel 205 from 9 (its original value) to 8 (the aggregate patch value). Note that the original pixel value of pixel 205 does not necessarily have to be replaced by the aggregate patch value. Instead the aggregate patch value may be used by a transformation function to update the pixel value of pixel 205.

Referring to Table 1 using weights designated under Weight B and FIGS. 2A-2I, the associated patch 255 is assigned a weight of 3. The associated patches 215 and 225 are each assigned a weight of 10. The associated patches 235, 275, and 295 are assigned a weight of 1. The associated patches 245, 255, 265, and 285 are each assigned a weight of 2. The weight of each associated patch as well as the relevant patch values are used to determine the aggregate patch value for a selected pixel. In this example, the weight given to each patch determines the number of times the patch value is included when calculating the aggregate patch value. For example, the patch value of 9 for patches 215 and 225 will be included ten times each in the calculation of the aggregate patch value as their respective weight is 1. The patch value of 9 for patch 235 will be included once in the calculation of the aggregate patch value as its weight is 1. The patch value of 8 for patches 245 and 265 will be included twice each in the calculation of the aggregate patch values as their weight is 2. The patch value of 8 for patch 255 will be included three times in the calculation of the aggregate patch value as its respective weight is 3. The patch value of 7 for patches 275 and 295 will be included once each in the calculation of the aggregate patch value as their respective weight is 1. The patch value of 7 for patch 285 will be included twice in the calculation of the aggregate patch value as its weight is 2. Therefore, the aggregate patch value may be calculated as the normalized value of each weight times its respective patch values. The aggregate patch value for the example above would be the normalized value of the summation of weight times patch values: $10(9)+10(9)+1(9)+2(8)+3(8)+2(8)+1(7)+2(7)+1(7)=273$.

Once normalized the aggregate patch value is 8.53125 which can be rounded to 8.5. The aggregate patch value of 8.5 can therefore be used by the pixel-specific thread process to update the pixel value of pixel 205.

Figure 4:
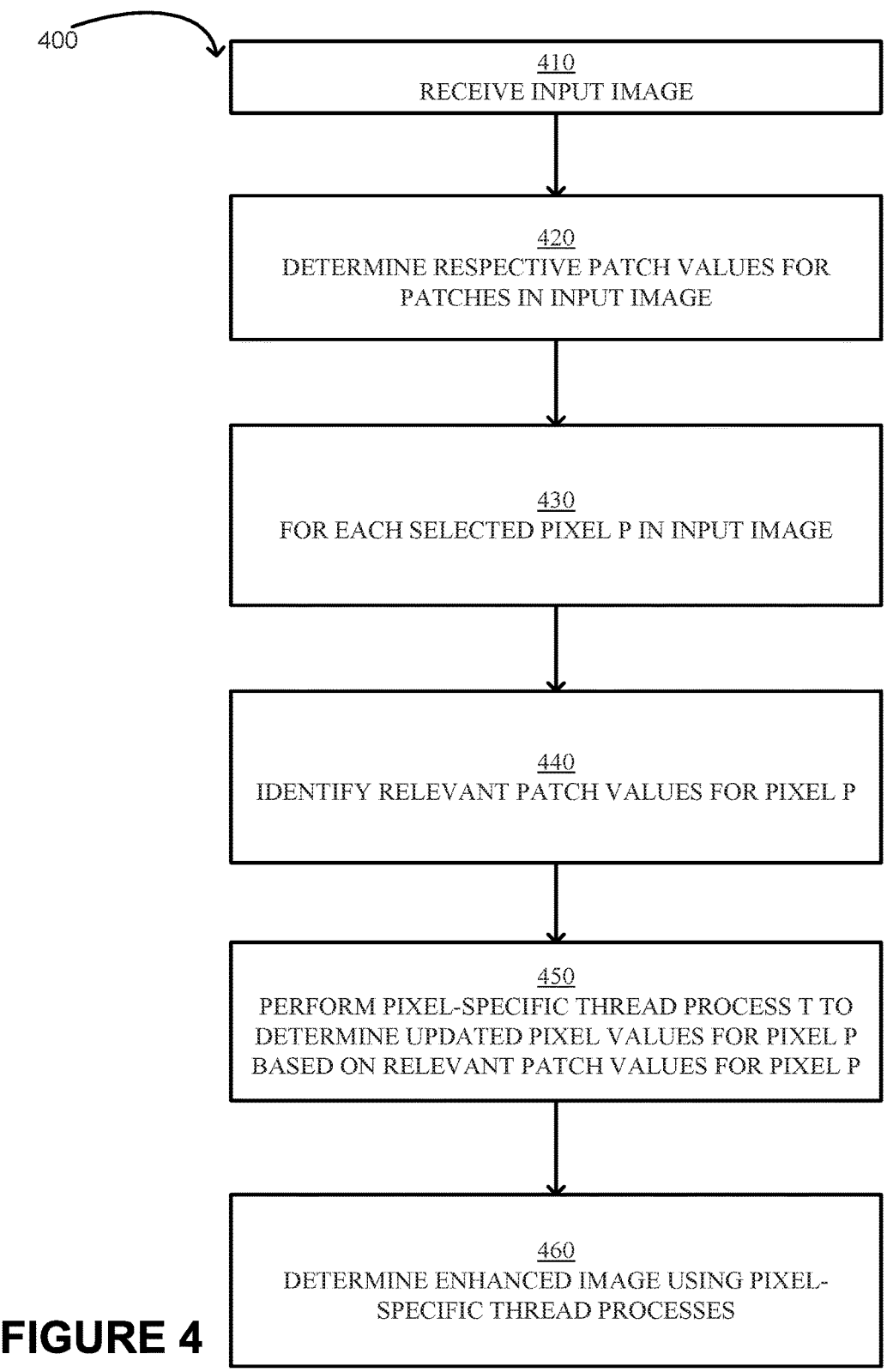
FIG. 4 is a flow chart illustrating an exemplary method for patch aggregation using pixel-specific processes.

Steps of an exemplary image enhancement procedure may be performed via any suitable computing device. FIG. 4 illustrates an exemplary image enhancement procedure using pixel-specific processes for updating pixels. The image enhancement procedure 400 involves receiving an input image comprising pixels, as shown in block 410. Each pixel comprises a location and a pixel value indicative of where and how each pixel is displayed in the image.

The exemplary image enhancement procedure 400 further involves determining respective patch values for patches in the input image, as shown in block 420. This may involve determining pre-defined size patches of the image and calculating a patch value for each pre-defined patch. The patch value provides update information for updating the pixels that make up the patch. Patch values may be accessed by several methods including a look-up table which contains patches and their respective patch value.

The exemplary image enhancement procedure 400 further involves for each pixel P in the input image, identifying relevant patch values for pixel P at step 430 and 440. Relevant patch values are patch values of the associated patches for pixel P. Various criteria may be used for selecting patches associated with a pixel. In one embodiment, a criteria for selecting associated patches of a pixel may be patches that contain the pixel, albeit at different locations within the patch. For example, if an image is divided into 2 pixels×2 pixels patches, a selected pixel may include four associated patches. One associated patch may contain the pixel at the location bottom-right. A second associated patch may contain the pixel at the location top-right. A third associated patch may contain the pixel at the location top-left. A fourth associated patch may contain the pixel at the location bottom-left. Once relevant patch values for associated patches of a pixel are identified, a pixel-specific thread process is performed to update the pixel value for the pixel based on the relevant patch values identified. The pixel-specific thread process may aggregate and normalize the relevant patch values and update the pixel value. In other embodiments, a maximum value or a minimum value of the relevant patch values may be identified to update the pixel value. The aggregation of the patch values for selected associated patches of a pixel contribute to the pixel value for each of the pixels of the enhanced image.

Another criteria that may be used to select relevant patch values may be similarity between patches. For example, associated patches of a selected pixel may be identified based on their similarity to a predetermined or baseline patch which contains pixel p. For example, given pixel p1 and patch P1 which contains p1 as one of its pixels, only associated patches of pixel p1 which are similar to patch P1 (the baseline patch) are selected. Similarity can be determined based on the similarity of the intensities of the respective patches. This similarity criteria is useful when a selected pixel is located on the corner of an image. If a selected pixel is located on the corner of an image, neighboring pixels in one direction (i.e. to the left of the selected pixel) may have very different intensities than pixels towards the other direction (i.e. to the right of the selected pixel). In this scenario, patch values most similar to a relevant patch value should be selected to update the selected pixel. For example similarity measures between patches may include but not limited to sum of squared difference or any mutual information shared between patches.

At step 450, pixel-specific thread processes are performed that determine an updated value for the pixel based on the relevant patch values. An average of the relevant patch values may be determined or the maximum or minimum patch value may be used to update the pixel. Patch values may contribute differently to the update value of a pixel. Different weights may be assigned to patches depending on selection criteria. For example, different weights may be assigned to a patch based on the location of the pixel within the patch. A patch that contains the selected pixel as its center pixel may be assigned a higher weight than a patch which contains the selected pixel as a corner pixel. Similarly, different weights may be assigned to patches based on their similarity to a relevant patch value. When updating a pixel value based on the relevant patch values, the weight given to the associated patch determines how much weight its patch value contributes to the updated pixel value. Additionally, in other embodiments, only relevant patch values from patches that have a weight above, below, or within a threshold may be selected. Therefore not all relevant patch values must be used to determine the updated pixel value.

The pixel-specific thread process updates each pixel independent from other pixels in the image. This allows, in one embodiment, to perform a plurality of pixel-specific thread processes in parallel to determine updated pixel values for multiple pixels based on respective patch values relevant to each respective pixel. Note that all or any number of pixels in an image may be selected to be updated. Additionally, any size patch samples may be used to determine patch values that contribute to the updated value of a pixel. Different size patch samples may also be used within the same image to determine patch values that contribute to the updated value of a pixel. For example, to improve accuracy within a region of interest in an image a bigger size patch may be used in that regions, such as 5 pixels by 5 pixels. For other regions in the image, a smaller patch size of 3 pixels by 3 pixels may be used.

In another embodiment, additional iterations of updating the pixel value may be performed. For each additional iteration, a previous image from the prior iteration is used as the input image.

The exemplary image enhancement procedure 400 further involves updating pixels of the input image to generate an enhanced image at step 460. The update of selected pixels may be performed in parallel by a plurality of pixel-specific thread processes.

Figure 5:
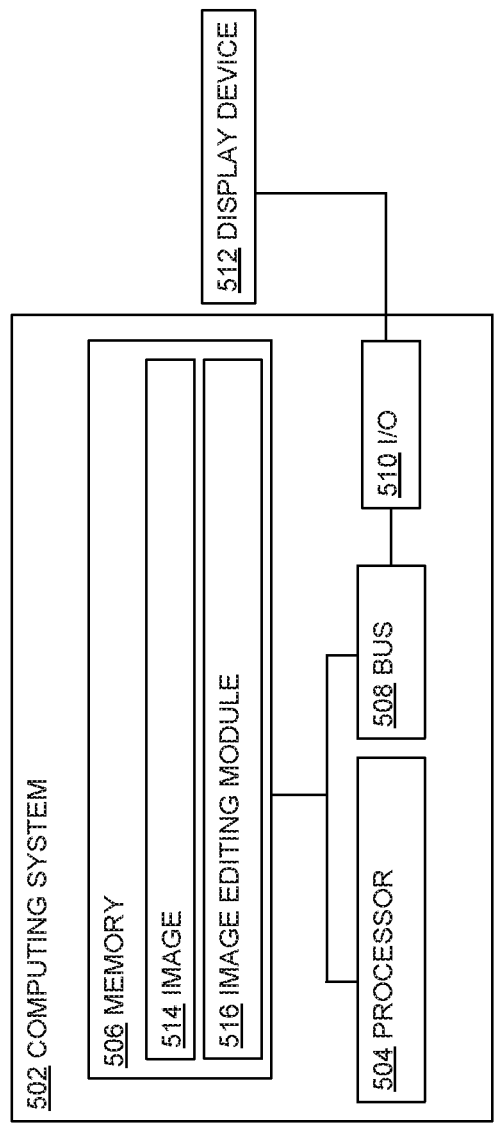
FIG. 5 Is a block diagram depicting an example computing system for implementing certain embodiments.

FIG. 5 is a block diagram depicting an example computing system 502 for implementing certain embodiments.

The computing system 502 comprises a processor 504 that is communicatively coupled to a computer-readable medium such as memory 506 and that executes computer-executable program instructions and/or accesses information stored in the memory 506. The processor 504 may comprise a microprocessor, an application-specific integrated circuit ("ASIC"), a state machine, or other processing device. The processor 504 can include any of a number of computer processing devices, including one processing device. Such a processor can include or may be in communication with a computer-readable medium storing instructions that, when executed by the processor 504, cause the processor to perform the steps described herein.

The computing system 502 may also comprise a number of external or internal devices such as input or output devices. For example, the computing system 502 is shown with an input/output ("I/O") interface 510 and a display device 512. A bus 508 can also be included in the computing system 502. The bus 508 can communicatively couple one or more components of the computing system 502.

The computing system 502 can modify, access, or otherwise use image 514. The image 514 may be resident in any suitable computer-readable medium. In one embodiment, the image 514 can reside in the memory 506 at the computing system 502. In another embodiment, the image 514 can be accessed by the computing system 502 from a remote content provider via a data network.

The memory 506 can include any suitable computer-readable medium. A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

An image editing module 516 stored in the memory 506 can configure the processor 504 to perform operations on image 514. In some embodiments, the image editing module 516 can be a software module included in or accessible by a separate application (such as but not limited to, a browser application) executed by the processor 504 that is configured to display, modify, access, or otherwise use the image 514. In other embodiments, the image editing module 416 can be a stand-alone application executed by the processor 504.

The computing system 502 can include any suitable computing device for executing the image editing module 516. Non-limiting examples of a computing device include a desktop computer, a tablet computer, a smart phone, a digital camera, or any other computing device suitable for editing the image 514. The computing system 502 may be a touch-screen enabled device.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   receiving an image comprising pixels located in the image, each pixel having a pixel value indicative of how the pixel is displayed in the image;
   determining a first subset of the pixels located in the image;
   determining a second subset of pixels located in the image, wherein at least one pixel in the first subset neighbors at least one pixel in the second subset; and
   for each pixel in the first subset:
      determining multiple overlapping patches within the image, the multiple patches containing the pixel,
      using an image enhancement algorithm to determine a respective patch value for each patch of the multiple overlapping patches, each patch value providing update information for updating the respective patch containing the pixel,
      identifying relevant patch values of the overlapping patches that provide information for updating the respective patch containing the pixel, and
      performing a first pixel-specific thread process by a processor to determine an aggregate patch value based on the relevant patch values; and
   performing a second pixel-specific thread process by the processor to update, based on the aggregate patch value for at least one pixel from the first subset, the pixel value for a neighboring pixel in the second subset.

2. The method of claim 1 further comprising performing a first plurality of pixel-specific thread processes executed in parallel to determine aggregate patch values based on respective patch values relevant to each respective pixel in the first subset.

3. The method of claim 1 further comprising performing a second plurality of pixel-specific thread processes executed in parallel to update, based on the respective aggregate patch values for the at least one pixel in the first subset, the respective pixel values for the respective neighboring pixels in the second subset.

4. The method of claim 1, wherein the aggregate patch value is determined based on averaging the relevant patch values.

5. The method of claim 1, wherein the aggregate patch value is determined based on a maximum relevant patch value or a minimum relevant patch value.

6. The method of claim 1, further comprising determining a weight for each relevant patch value based on the pixel in the first subset being located within a respective patch for the relevant patch value; and wherein updating the pixel value of the neighboring pixel in the second subset is further based on the respective weight of each relevant patch value.

7. The method of claim 1 further comprising performing additional iterations of updating the pixel value for the neighboring pixel in the second subset, wherein, in each of the additional iterations, a previous image from the prior iteration is used as the input image.

8. The method of claim 1, wherein patch values are stored in a look-up table.

9. The method of claim 1, wherein information of patches corresponding to the relevant patch values for each respective pixel in the first subset is kept in a look-up table.

10. The method of claim 1, wherein relevant patch values are identified from respective patches that contain each respective pixel in the first subset.

11. A system comprising:
one or more processor for executing an image editing module comprising computer-readable instructions, which, when executed, cause the one or more processor to perform operations comprising:
receiving an image comprising pixels located in the image, each pixel having a pixel value indicative of how the pixel is displayed in the image;
determining a first subset of the pixels located in the image;
determining a second subset of pixels located in the image, wherein at least one pixel in the first subset neighbors at least one pixel in the second subset; and
for each pixel in the first subset:
determining multiple overlapping patches within the image, the multiple overlapping patches containing the pixel,
using an image enhancement algorithm to determine a respective patch value for each patch of the multiple overlapping patches, each patch value providing update information for updating the respective patch containing the pixel,
identifying relevant patch values of the overlapping patches that provide information for updating the respective patch containing the pixel, and
performing a first pixel-specific thread process to determine an aggregate patch value for the pixel, based on the relevant patch values; and
performing a second pixel-specific thread process by the processor to update, based on the aggregate patch value for at least one pixel from the first subset, the pixel value for a neighboring pixel in the second subset.

12. The system of claim 11, wherein the image editing module comprises further instructions for:
performing a first plurality of pixel-specific thread processes executed in parallel to determine aggregate patch values for multiple pixels based on respective patch values relevant to each respective pixel in the first subset.

13. The system of claim 11, wherein the image editing module comprises further instructions for:
performing a second plurality of pixel-specific thread processes executed in parallel to update, based on the respective aggregate patch values for the at least one pixel in the first subset, the respective pixel values for the respective neighboring pixels in the second subset.

14. The system of claim 11, wherein the image editing module comprises further instructions for:
determining a weight for each relevant patch value based on the pixel in the first subset being located within a respective patch for the relevant patch value; and wherein updating the pixel value of the neighboring pixel in the second subset is further based on the respective weight of each relevant patch value.

15. A non-transitory computer-readable medium tangibly embodying program code executable by at least one processor for providing an image editing application, the program code comprising:
program code for receiving an image comprising pixels located in the image, each pixel having a pixel value indicative of how the pixel is displayed in the image;
program code for determining a first subset of the pixels located in the image;
program code for determining a second subset of pixels located in the image, wherein at least one pixel in the first subset neighbors at least one pixel in the second subset; and
for each pixel in the first subset:
program code for determining multiple overlapping patches within the image, the multiple overlapping patches containing the pixel,
program code for using an image enhancement algorithm to determine a respective patch value for each patch of the multiple overlapping patches, each patch value providing update information for updating the respective patch containing the pixel,
program code for identifying relevant patch values of the overlapping patches that provide information for updating the respective patch containing the pixel, and
program code for performing a first pixel-specific thread process to determine an aggregate patch value for the pixel, based on the relevant patch; and
performing a second pixel-specific thread process by the processor to update, based on the aggregate patch value for at least one pixel from the first subset, the pixel value for a neighboring pixel in the second subset.

16. The non-transitory computer-readable medium of claim 15, further comprising:
program code for performing a first plurality of pixel-specific thread processes executed in parallel to determine aggregate patch values based on respective patch values relevant to each respective pixel in the first subset.

17. The non-transitory computer-readable medium of claim 15, further comprising:
program code for performing a second plurality of pixel-specific thread processes executed in parallel to update, based on the respective aggregate patch values for the at least one pixel in the first subset, the respective pixel values for the respective neighboring pixels in the second subset.

18. The non-transitory computer-readable medium of claim 15, further comprising:
    program code for determining a weight for each relevant patch value based on the pixel in the first subset being located within a respective patch for the relevant patch value; and wherein updating the pixel value of the neighboring pixel is further based on the respective weight of each relevant patch value.

19. The non-transitory computer-readable medium of claim 15, wherein the aggregate patch value is determined based on averaging the relevant patch values.

20. The non-transitory computer-readable medium of claim 15, wherein the aggregate patch value is determined based on a maximum relevant patch value or a minimum relevant patch value.

\* \* \* \* \*